United States Patent Office 3,475,031
Patented Oct. 28, 1969

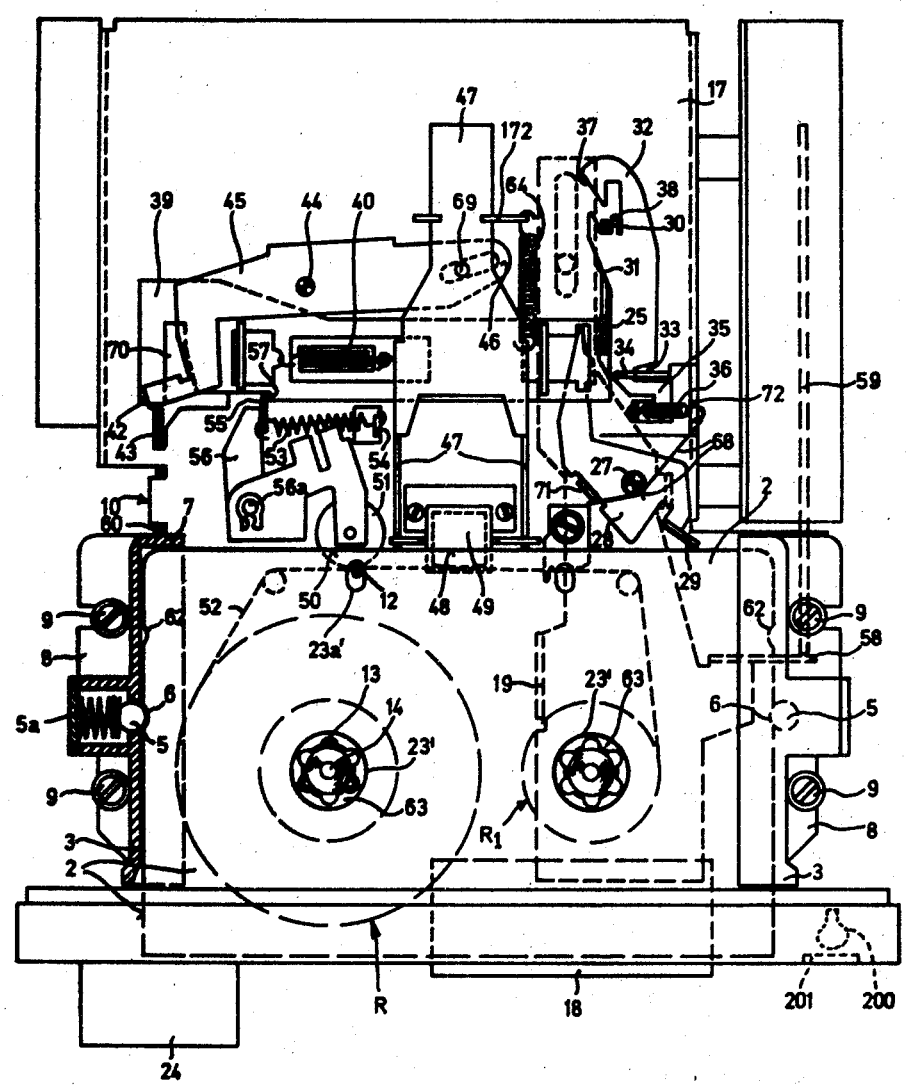

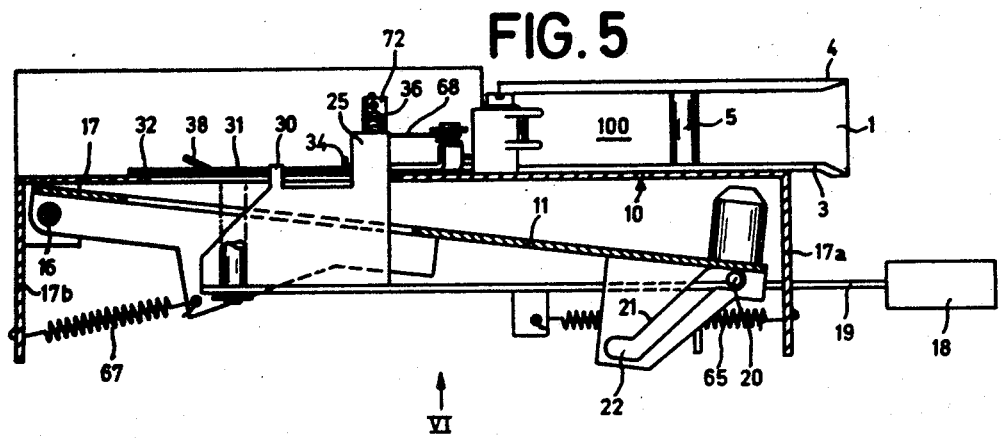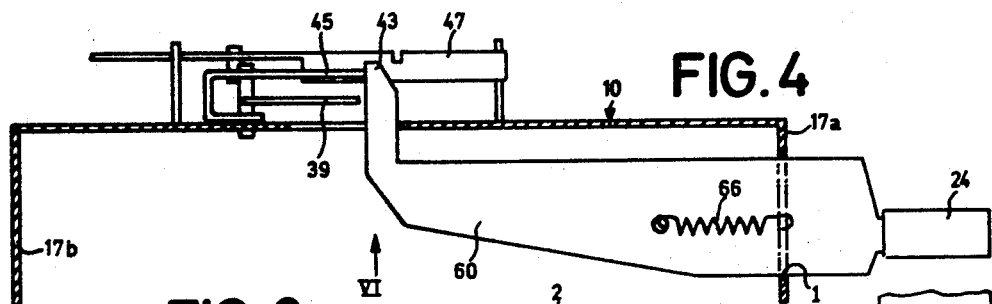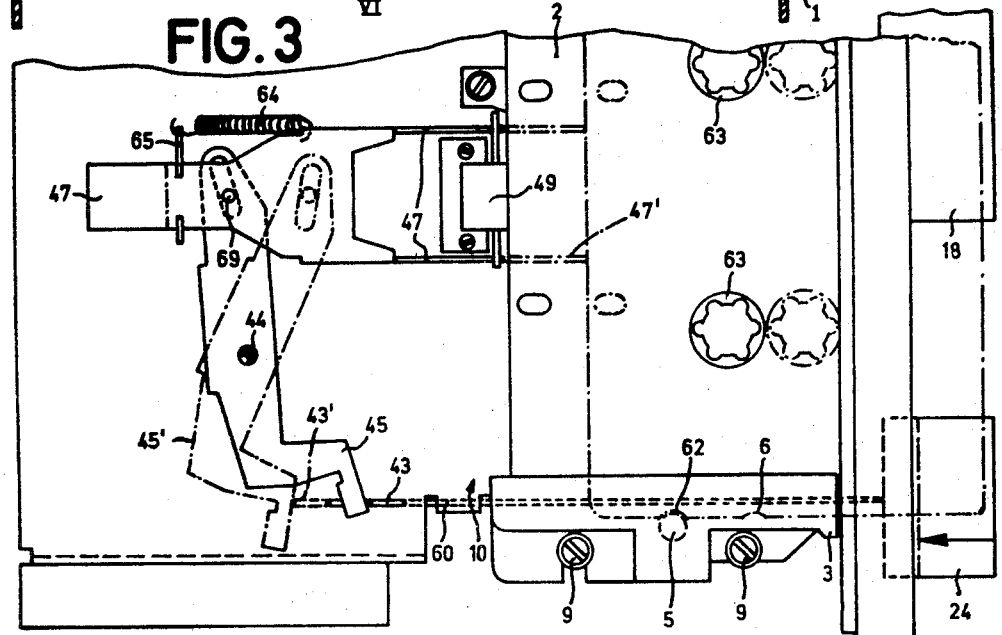

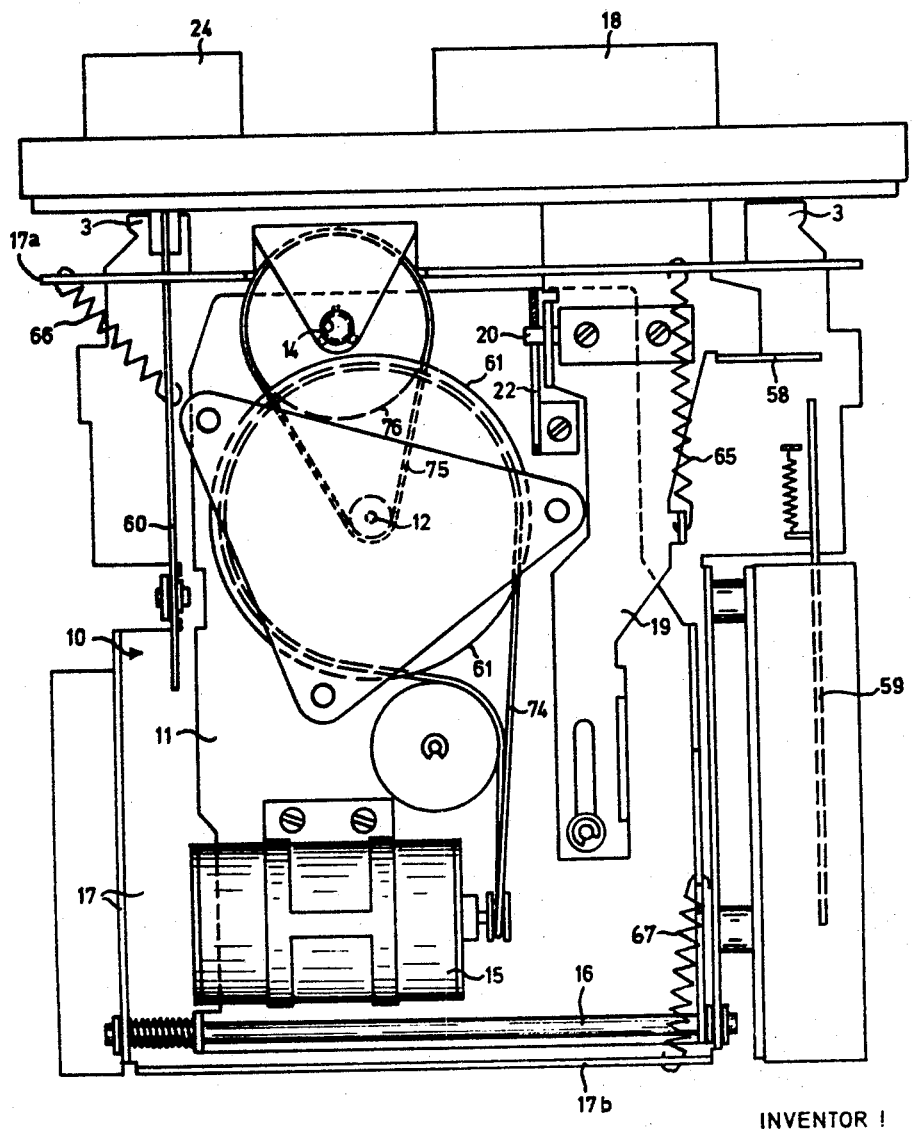

3,475,031
SOUND REPRODUCING APPARATUS
Dieter Kuehnlein, Nuremberg, Germany, assignor to Grundig E.M.V. Elektro-Mechanische Versuchsanstalt Inh., Max Grundig, Furth, Bavaria, Germany
Filed Aug. 18, 1966, Ser. No. 573,403
Claims priority, application Germany, Jan. 14, 1966, G 33,747
Int. Cl. G11b 5/02
U.S. Cl. 274—4    11 Claims

ABSTRACT OF THE DISCLOSURE

A sound reproducing apparatus which is built into the dashboard of an automotive vehicle and utilizes tape-containing magazines. An actuating button is released and can be depressed to start the sound reproducing unit when a magazine is fully inserted into the housing of the apparatus. Repeated depression of the actuating button inactivates the sound reproducing unit and initiates release of a second button which can be depressed to effect partial ejection of the magazine.

---

The present invention relates to sound reproducing apparatus in general, and more particularly to improvements in sound reproducing apparatus of the type which may be utilized in automotive vehicles to reproduce sounds recorded on magnetic tape.

It is an important object of the present invention to provide a very compact sound reproducing apparatus which can be accommodated in or attached to the dashboard of an automotive vehicle and which can be readily manipulated by the driver or by the person or persons occupying the seat next to the driver's seat.

Another object of the invention is to provide a sound reproducing apparatus which can use commercially available tape-containing magazines and which can reproduce sounds recorded on tapes with one or more sound tracks.

A further object of the instant invention is to provide a sound reproducing apparatus which can utilize one or more components of a conventional radio in an automotive vehicle so that the housing or chassis of such apparatus can be made smaller to take up very little space and to be readily installed in all types of vehicles, even in compact and miniature cars.

An additional object of my invention is to provide an exceptionally rugged sound reproducing apparatus which can readily withstand vibrations of road vehicles, watercraft or aircraft, which is constructed and assembled in such a way that its sensitive parts cannot be damaged by a careless operator, and which can be manipulated by resorting to a minimal number of actuating elements so that, by operating such elements, the driver is not in danger of losing control of the vehicle.

A concomitant object of the invention is to provide a sound reproducing apparatus which can be built into new as well as into used automotive vehicles and wherein a tape-containing magazine may be ejected or withdrawn only when the parts which advance and track the tape are moved away from engagement therewith.

Still another object of the invention is to provide a sound reproducing apparatus which can hold a properly accommodated tape-containing magazine against rattling and which can also support and clamp the magazine in partially ejected or withdrawn position.

Briefly stated, one feature of the present invention resides in the provision of a sound reproducing apparatus of the type which utilizes prefabricated tape-containing magazines or cartridges. The apparatus comprises a housing or chassis which can be supported in or on the dashboard of an automotive vehicle and defines a chamber dimensioned to accommodate a magazine which is introduced through a suitable inlet of the housing, a normally idle sound reproducing unit provided in or on the housing and including means for advancing and tracking the tape contained in a magazine which is introduced into and is properly located in the chamber of the housing, a starter button or analogous actuating means provided on the housing and movable from a first to a second position to thereby actuate the sound reproducing unit, and blocking means provided in the chamber for normally blocking the actuating means in the first position. Such blocking means is expelled from the chamber to thereby release the actuating means in response to insertion of a magazine into the chamber.

In accordance with another advantageous feature of the present invention, the apparatus can be provided with an ejector which may be operated by a second push button or by analogous manipulating means and can displace the magazine in a direction toward the inlet of the housing. This ejector and/or the manipulating means therefor is preferably blocked when the actuating means for the sound reproducing unit assumes its second or operative position but is released as soon as the actuating means returns to first position. The housing is preferably provided with suitable detent means which can yieldably hold the magazine in fully inserted position as well as in a partially expelled or displaced position in response to motion imparted to the magazine by the ejector, i.e., in response to manual actuation of the manipulating means for the ejector.

The novel features which are considered as characteristic of the invention as set forth in particular in the appended claims. The improved sound reproducing apparatus itself, however, both as to its construction and its mode of operation, together with additional features and advantages thereof, will be best understood upon perusal of the following detailed description of a specific embodiment with reference to the accompanying drawings, in which:

FIG. 2 is a similar top plan view but showing a magazine in fully inserted position and with the actuating means in operative position;

FIG. 3 is a fragmentary top plan view of the apparatus, with the ejector for the magazine shown in idle and operative positions which are respectively indicated by solid and phantom lines;

FIG. 4 is a section as seen in the direction of arrows from the line IV—IV of FIG. 1;

FIG. 5 is a section as seen in the direction of arrows from the line V—V of FIG. 1; and FIG. 6 is a bottom plan view of the apparatus as seen in the direction of arrows VI shown in FIGS. 4 and 5.

Figure 1:
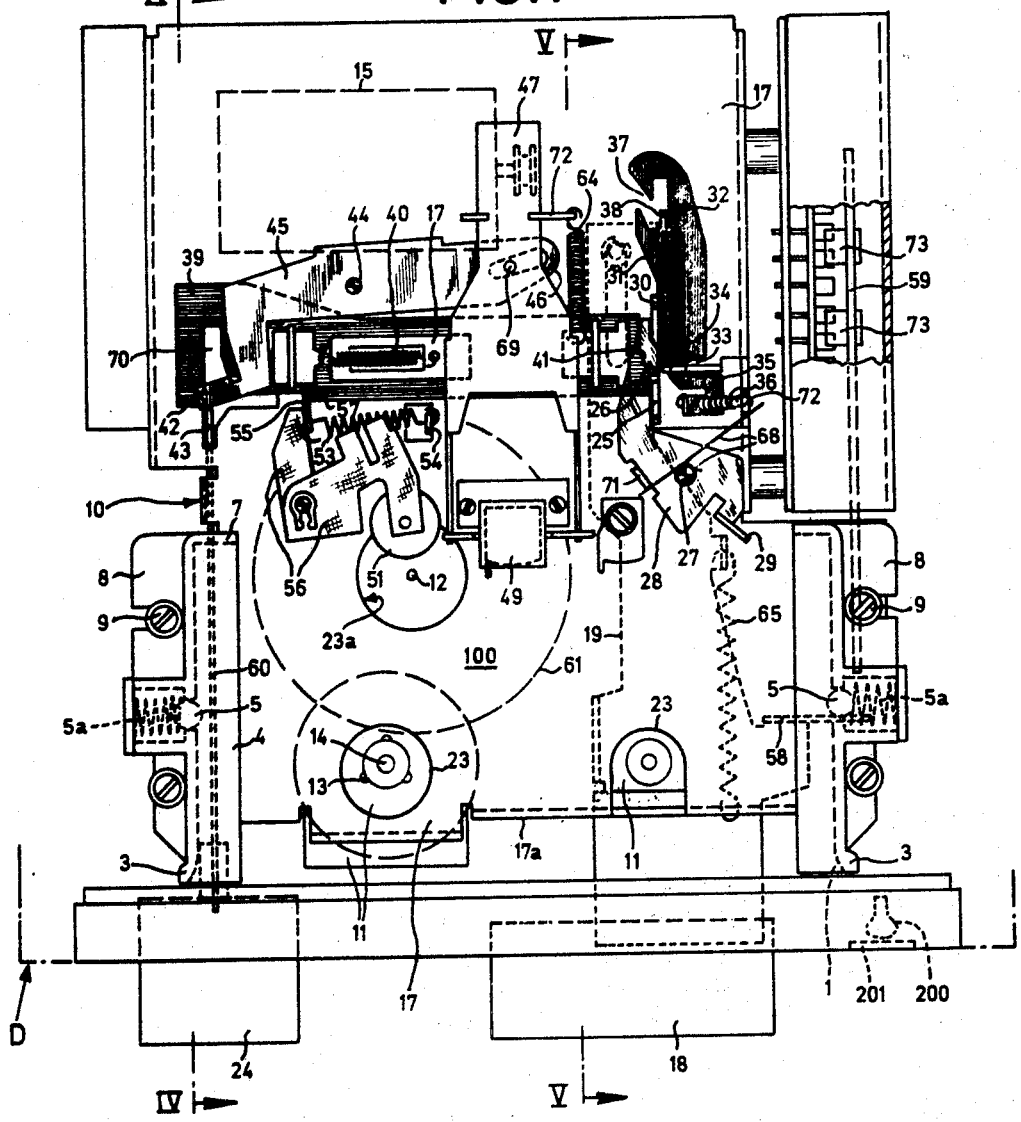
FIG. 1 is a top plan view of a sound reproducing apparatus which embodies the present invention, with the tape-containing magazine removed.

Referring to the drawings in detail, there is shown a sound reproducing apparatus which may be installed in or below the dashboard D of an automotive vehicle, preferably in such a way that its housing or chassis 10 is readily detachable from the dashboard. The connection may comprise screws, bolts or analogous fasteners. It is further preferred to install the chassis 10 in close proximity to the radio of the vehicle so that the two apparatus can utilize the same loud-speaker or the same set of loudspeakers. Furthermore, the electric circuits of the radio and sound reproducing apparatus may be integrated in such a way that the output amplifier of the radio can be used when the sound reproducing apparatus is on. This reduces the space requirements of the apparatus and enables the manufacturer to accommodate all components of the sound reproducing apparatus in or on a relatively small chassis. Such integration of the two circuits does not reduce the versatility of the radio and/or sound reproducing apparatus since it is highly unlikely that both will be used at the same time.

The downwardly extending front flange 17a (see FIG. 5) of the chassis 10 is located below an inlet 1 for a flat box-shaped tape-containing magazine or cassette 2. This magazine is shown in FIGS. 2 and 3. The inlet 1 is bounded by side walls 3 which may consist of synthetic plastic material and are detachably affixed to the plate-like main body portion or base 17 of the chassis 10. Each side wall 3 comprises a substantially channel-shaped or U-shaped portion 4 and an outwardly extending flange or rib 8 which is affixed to the base 17 by screws 9 or similar fasteners. The rear end portions of the side walls 3 are formed with inwardly extending stops 7 serving to arrest a magazine 2 when the latter is properly introduced through the inlet 1 and advances in ways defined by the channel-shaped portions 4 of the side walls 3. Each side wall 3 further carries a detent device including a roller or sphere 5 a portion of which projects into the groove defined by the respective channel-shaped portion 4 and which is biased by a helical expansion spring 5a. The bias of the two springs 5a need not be the same, and these springs are strong enough to compensate for eventual differences between the dimensions of several magazines 2. The cutouts for the rollers or spheres 5 (hereinafter called retainers) are located substantially midway between the ends of the respective channel-shaped portions 4 and each thereof may snap into a concave socket 6 provided in the adjoining side wall of the magazine 2 when the latter is fully inserted through the inlet 1 so that its innermost wall abuts against the stops 7. The base 17 defines with the side walls 3 of the chassis 10 a chamber 100 which can accommodate the major part of a magazine 2. This chamber is shown in FIGS. 1 and 5. If desired, the chamber 100 may be closed from above by a suitable lid or by a shell which receives the chassis 10.

The chassis 10 carries a support in the form of a platform 11 (see particularly FIGS. 5 and 6) which is hingedly connected to the rear or inner flange 17b of the chassis and is rockable on a transversely extending horizontal pintle 16. The platform 11 supports several components of a sound reproducing unit including a capstan spindle 12, the elements 13, 14 of a torque-transmitting coupling, and a prime mover here shown as an electric motor 15. When a relatively wide actuating member 18 (hereinafter called starter button) is depressed by an occupant of the vehicle, a pusher or arm 19 of this starter button causes the platform 11 to pivot upwardly from a lower level to an operative position (i.e., in a counterclockwise direction, as viewed in FIG. 5) to move the components 12–15 of the sound reproducing unit nearer to the underside of the base 17. The arm 19 carries a follower 20 which is received in a cam slot 21 provided in a downwardly bent bracket 22 of the platform 11, and the configuration of the cam slot 21 is such that the platform rises automatically to operative position when the follower 20 travels in a direction to the left, as the parts appear in FIG. 5. The chassis 10 has two cutouts 23 (see FIG. 1) which registers with similar cutouts 23' (see FIG. 2) in the bottom plate of the magazine 2 when the latter is properly inserted into the chamber 100, and the elements 13, 14 of the coupling extend upwardly through one of the cutouts 23 and through the corresponding cutout 23' when the starter button 18 is depressed whereby the coupling engages the core 63 of one of the two reels R, R1 in the interior of the magazine 2 to drive the respective reel as soon as the motor 15 is started. The capstan spindle 12 then extends upwardly through registering openings 23a, 23a' of the chassis 10 and magazine 2, such openings being respectively shown in FIGS. 1 and 2.

The sound reproducing apparatus of the present invention comprises only two buttons, namely, the aforementioned starter button 18 which is biased by a return spring 65 so that it tends to assume a first position shown in FIG. 1, and a second button 24 which is biased by a return spring 66 (see FIGS. 4 to 6). The button 24 is used as a means for manipulating an ejector 47 which will be described hereinafter. The arm 19 of the starter button 18 comprises an upwardly extending projection or lug 25 which is normally engaged by a similar projection or lug 26 (see FIG. 1) extending downwardly from one arm of a blocking lever 28 mounted on the chassis 10 for rotation about a vertical pivot pin 27. The other arm of the blocking lever 28 is provided with a motion receiving plate 29 which extends into the chamber 100, i.e., into the path of the magazine 2 and rocks the lever 28 in a counterclockwise direction, as viewed in FIG. 1, when the magazine is fully inserted into the chassis so that its sockets 6 receive portions of the retainers 5. The lug 26 is then disengaged from the lug 25 so that the operator can depress the starter button 18. In other words, the lever 28 constitutes an automatic blocking device which allows for depression of the starter button 18 only when the chamber 100 of the chassis 10 accommodates a properly inserted magazine 2. A torsion spring 68 is convoluted around the pivot pin 27 and its terminals respectively abut against two stops 71, 72 the first of which is provided on the blocking lever 28. The second stop 72 is provided on the chassis 10 and, as clearly shown in FIG. 1, the spring 68 tends to rotate the blocking lever 28 in a clockwise direction so as to normally maintain the lug 26 in engagement with the lug 25 whenever the return spring 65 is free to expel the starter button 18 to its idle or first position.

The arm 19 of the starter button 18 is further provided with a second upwardly extending projection or lug 30 (see FIGS. 1, 2 and 5) which constitutes a follower and tracks the cam face 31 of a rockable retaining lever 32. When the starter button 18 is depressed to assume a second position (i.e., slightly beyond the third or intermediate position shown in FIG. 2), the follower 30 rocks the retaining lever 32 in a clockwise direction, as viewed in FIG. 2. This retaining lever has a notch 33 which receives a bent-over portion 34 of the chassis 10 serving to support the lever 32 for rotation about a vertical and about a horizontal axis. A spring 36 is connected with the shorter arm 35 of the retaining lever 32 and to the chassis 10, and its function is to bias the retaining lever in a counterclockwise direction. This causes the follower 30 to snap into a cutout 37 of the retaining lever 32 in response to full depression of the starter button 18 whereby, upon termination of finger pressure against the button 18, the arm 19 is biased by the spring 65 to assume the aforementioned third position in which the follower 30 bears against an upwardly bent abutment 38 in the cutout 37. Such third position of the follower 30 is shown in FIG. 2. When the starter button 18 is pressed again for the purpose of unblocking the button 24, the follower 30 slides below the abutment 38 (which latter is inclined upwardly) so that the spring 36 can rock the retaining lever 32 and the button 18 can return to the idle or non-depressed first position of FIG. 1.

In order to prevent improper manipulation of the apparatus, the second button 24 is automatically locked or blocked during blocking of the starter button 18 in the latter's first position. This is accomplished by the provision of a motion transmitting member or slide 39 which extends transversely across the chassis 10 and is biased by a helical spring 40, the latter tending to move the slide 39 in a direction to the right, as viewed in FIGS. 1 and 2. The slide 39 can follow the bias of the spring 40 if the starter button 18 is depressed subsequent to proper insertion of the magazine 2, i.e., when the button 18 is moved from the third position shown in FIG. 2 to its second or fully depressed position. The lug 25 of the arm 19 on the starter button 18 then travels along and beyond a cam face 41 on the slide 39. When the slide 39 moves to the right, its projection 42 is located in front of a projection 43 provided on an inwardly extending pusher or arm 60 of the button 24. Such locking of the button 24 also results in locking of a two-armed motion transmitting lever 45 which is normally rockable on a vertical shaft 44. The shorter arm of the lever 45 is rockable by the projection 43 and the longer arm 46 of this lever is coupled to the ejector 47 which can expel the magazine 2 from the chassis 10. More accurately stated, the ejector 47 can displace the magazine 2 in a direction toward and through the inlet 1. The operative connection between the arm 46 and ejector 47 is a pin-and-slot connection 69 shown in FIGS. 2 and 3. A return spring 64 tends to maintain the ejector 47 in the solid-line retracted position of FIG. 3. This spring 64 is coupled to the ejector and to a post 172 of the chassis 10.

The operation of the sound reproducing apparatus is as follows:

The driver or the person occupying the front seat next to the driver inserts a magazine 2 through the inlet 1. Such magazines are of known design and their inner or front end walls are provided with three rectangular recesses including a centrally located recess 48 and a left-hand recess 50 (reference being had to FIG. 2). The recess 48 receives a sound reproducing head 49 which is mounted in the chassis 10 and the recess 50 receives an elastic pinch wheel 51 which is rockable with reference to the chassis. The magazine 2 is preferably of the type which can be inverted and reinserted into the chamber 100 so as to place the second track on its magnetic tape 52 into requisite position for tracking by the head 49. A properly introduced magazine 2 is automatically held by the retainers 5 which then extend into the corresponding sockets 6.

During insertion of the magazine 2 into the chamber 100, the front end wall of the magazine expels the plate 29 from the chamber 100 whereby the plate 29 rocks the blocking lever 28 about the pin 27 (in a counterclockwise direction) so that the lug 26 moves away from the pathway of the arm 19 and the starter button 18 is unlocked. The button 18 is thereupon depressed and the follower 20 of its arm 19 slides in the cam slot 21 of the bracket 22 to rock the platform 11 upwardly (i.e., in a counterclockwise direction, as viewed in FIG. 5). The platform 11 raises the capstan spindle 12 which is connected to a rotary mass 61. This platform also raises the coupling elements 13, 14 and the motor 15. The components 12, 13 and 14 of the sound reproducing unit enter the magazine 2 from below.

During the last stage of depression of the starter button 18 and arm 19, the slide 39 allows the pinch wheel 51 to rock in a clockwise direction, as viewed in FIG. 1, and to the position shown in FIG. 2. Such rocking of the pinch wheel 51 is effected by a spring 53 which is attached to the chassis 10, as at 54, and to a lever 56 which is pivoted at 56a and carries a pallet 55 engaging with a hook 57 of the slide 39. The lever 56 carries the pinch wheel 51.

The slide 39 can follow the bias of the spring 40 when the lug 25 of the arm 19 has moved along and beyond the cam face 41, and the slide then assumes the position shown in FIG. 2.

The arm 19 further comprises a motion transmitting portion 58 which can shift an elongated spring-biased carrier 59 provided with movable electric contacts 73. These contacts engage complementary contacts in the chassis 10 to complete the circuit of the motor 15. At the same time, the contacts 73 complete the circuit of a signal lamp 200 which indicates that the apparatus is in operative condition. This signal lamp 200 is installed in the front flange 17a adjacent to the button 18 and is located behind a transparent or translucent pane 201 of plastic material.

The output shaft of the motor 15 drives a belt 74 for the mass 61 (see FIG. 6) and a pulley on the capstan spindle 12 drives a second belt 75 for the pulley 76 of the element 14 which constitutes a mandrel for the reel R in the magazine 2. The spindle 12 cooperates with the pinch wheel 51 to advance the tape 52 at a constant speed whereby the tape travels along the sound reproducing head 49. One end of the tape 52 is fixedly secured to the core 63 of the reel $R_1$ so that the tape comes to a halt when it is completely paid out by the reel $R_1$. This terminates the reproduction of sound and the operator then knows that the apparatus should be turned off. The materials utilized for the manufacture of the tape 52, capstan spindle 12 and pinch wheel 51 as well as the pressure of wheel 51 and torque of the coupling elements 13, 14 are selected with a view to avoid any damage to such parts even if the operator fails to turn off the apparatus long after the tape has been fully collected on the reel R.

The magazine 2 will be ejected or displaced subsequent to repeated depression of the starter button 18. Such depression causes the lever 32 to release the projection 30 of the arm 19 so that the button 18 is free to follow the bias of its return spring 65 and the follower 20 returns the platform 11 to its lower end position shown in FIG. 5. The slide 39 is moved in a direction to the left, as viewed in FIG. 2, and moves the pinch wheel 51 away from the capstan spindle 12. A spring 67 (shown in FIG. 5) maintains the platform 11 in the lower end position.

When the slide 39 returns to the position shown in FIG. 1, its projection 42 is moved away from registry with the projection 43 on the arm 60 of the button 24 so that the latter can be depressed by hand. The projection 43 then registers with a cutout 70 of the slide 39. In response to depression of the button 24, the projection 43 rocks the lever 45 in a clockwise directions so that the ejector 47 expels or displaces the magazine 2 by overcoming the bias of springs 5a which urge the retainers 5 into the adjoining recesses 6. The ejecting or operative position of the ejector 47 is shown in FIG. 3 by phantom lines at 47'. Phantom lines 43' and 45' respectively indicate the corresponding positions of the projection 43 and lever 45.

The side walls of the magazine 2 are preferably provided with a second set of sockets 62 which receive the retainers 5 when the ejector 47 has been moved to the position 47'. This keeps the magazine 2 in partially expelled position in which it can be readily grasped by hand to be fully withdrawn and reinserted after turning through 180 degrees to play the second track of the tape 52. Alternatively, the partially expelled magazine 2 can be fully withdrawn and replaced by a fresh magazine.

The aforementioned contacts 73 on the carrier 59 may also perform the additional function of connecting the loudspeaker of a radio in the automotive vehicle with the sound reproducing apparatus so that such loudspeaker (and eventually the output amplifier of the radio) can be used when the apparatus shown in FIGS. 1 to 6 is in actual use.

In addition to the components 12–15, the aforementioned sound reproducing unit further includes the pinch wheel 51 and the sound reproducing head 49.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a sound reproducing apparatus of the type utilizing tape-containing magazines, particularly in an apparatus which is built into the dashboard of an automotive vehicle which is equipped with a radio receiver and wherein the sound reproducing apparatus and the receiver have common loudspeaker means, a housing adapted to be supported by the dashboard of the vehicle and defining a chamber dimensioned to accommodate a magazine, said housing further having an inlet through which the magazine can be introduced into and withdrawn from said chamber; a support arranged within said housing; a sound reproducing unit including a plurality of sound reproducing components carried by and movable with said support; means mounting said support within said housing for movement between an operative position in which said sound reproducing components cooperate with a magazine introduced into said chamber and an inoperative position in which said sound reproducing components do not cooperate with the magazine; actuating means provided on said housing and movable between an operative first position actuating said sound reproducing unit and an inoperative second position not actuating said sound reproducing unit; means for moving said support from inoperative to operative position in response to movement of said actuating means from second to first position; blocking means movable between a blocking position preventing movement of said actuating means from second to first position and a releasing position in which said actuating means is free to move to first position, said blocking means being automatically moved from blocking to releasing position upon insertion of a magazine into said chamber; ejector means for displacing the magazine in said chamber in a direction toward said inlet; manually operated manipulating means for actuating said ejector means; locking means for locking said manipulating means so as to prevent actuation of said ejector means, said locking means being movable between a locking and an unlocking position; and means for moving said locking means from locking to unlocking position in respose to movement of said actuating means from first to second position.

2. A structure as set forth in claim 1, wherein said support comprises a platform which is located at a level below and is rockable with reference to said housing between said operative position and a lower position corresponding to inoperative position of said support, said components on the platform including a rotary capstan spindle, rotary coupling means for engaging complementary coupling means on the core of a reel provided in a magazine which is accommodated in said chamber, and a prime mover for driving said spindle and said coupling means.

3. A structure as set forth in claim 1, wherein said housing comprises a base bounding said chamber from below and said sound reproducing unit comprises a second group of components mounted on said base and including a sound reproducing head adjacent to said chamber, said first mentioned group of components being provided at a level below said base and being movable by said support upwardly through openings provided therefor in said base.

4. A structure as set forth in claim 1, further comprising spring-biased detent means provided in said housing and normally extending into said chamber to be displaced by and to thus releasably retain a magazine in said chamber.

5. A structure as set forth in claim 1, wherein said actuating means is movable to a third position intermediate said first and second positions thereof and further comprising biasing means for urging said actuating means from said first to said second position so that, upon completed manual displacement of said actuating means to first position the actuating means moves toward said third position, retaining means for holding the actuating means in third position against the opposition of said biasing means and for automatically releasing said actuating means in response to movement of actuating means from third to first position, and means for idling said sound reproducing unit in response to disengagement of said retaining means from said actuating means.

6. A structure as set forth in claim 1, wherein said sound reproducing unit comprises a second group of components mounted on said housing adjacent to said chamber.

7. A structure as set forth in claim 1, wherein said actuating means comprises a manually reciprocable button and further comprising means for producing a detectable signal in response to movement of said button from second position.

8. A structure as set forth in claim 1, further comprising detent means for releasably holding the magazine subsequent to displacement by said ejector means.

9. A structure as set forth in claim 2, further comprising a pinch wheel supported by said housing for movement toward and away from said capstan spindle and motion transmitting means for moving said pinch wheel toward said spindle in response to movement of said actuating means from said second position, said spindle and said pinch wheel being disposed at the opposite sides of a portion of the tape contained in a magazine which is accommodated in said chamber so that the tape will be moved lengthwise in response to rotation of said spindle when the pinch wheel is moved toward and presses the tape against said spindle.

10. A structure as set forth in claim 8, further comprising means for biasing said ejector means to an inoperative position, said locking means being arranged to lock said ejector means in such inoperative position in response to movement of said actuating means from second position.

11. A structure as set forth in claim 8, wherein said ejector means is arranged to displace the magazine to such an extent that a portion of the thus displaced magazine extends through said inlet and can be readily grasped by hand for complete withdrawal from said chamber.

References Cited

UNITED STATES PATENTS

| 3,350,025 | 10/1967 | Lear | 179—100.2 |
| 3,080,101 | 3/1963 | Kreither et al. | |
| 2,914,620 | 11/1959 | Dale | 179—100.2 |
| 2,876,005 | 3/1959 | Gash | 179—100.2 |
| 2,867,389 | 1/1959 | Victs | 179—100.2 |

FOREIGN PATENTS

| 1,207,653 | 12/1965 | Germany. |
| 966,791 | 9/1957 | Germany. |

LEONARD FORMAN, Primary Examiner

ROGER A. FIELDS, Assistant Examiner

U.S. Cl. X.R.

242—55.13